United States Patent [19]
Brown, deceased et al.

[11] 3,958,836
[45] May 25, 1976

[54] MOVABLE TRACK ASSEMBLY FOR DRIVE TRACKS

[76] Inventors: Cicero C. Brown, deceased, late of Houston, Tex.; by Joe R. Brown, executor, P.O. Box 19236, Houston, Tex. 77024

[22] Filed: Jan. 9, 1975

[21] Appl. No.: 539,918

[52] U.S. Cl. .............................. 305/14; 305/58 PC; 74/257
[51] Int. Cl.² ..................................... B62D 55/00
[58] Field of Search .................. 305/14, 58, 59, 36, 305/37; 74/257, 251 R

[56] References Cited
UNITED STATES PATENTS

| | | | |
|---|---|---|---|
| 2,823,081 | 2/1958 | Mayo | 305/59 |
| 3,178,239 | 4/1965 | Zeller | 305/14 |
| 3,336,089 | 8/1967 | Krickler | 305/14 |
| 3,463,560 | 8/1969 | Reinsma | 305/59 |
| 3,490,773 | 1/1970 | Dennison | 305/14 |
| 3,492,054 | 1/1970 | Boggs | 305/14 |
| 3,731,551 | 5/1973 | Nelson | 305/14 |
| 3,829,173 | 8/1974 | Stedman | 305/14 |

*Primary Examiner*—Philip Goodman
*Assistant Examiner*—John A. Carroll
*Attorney, Agent, or Firm*—Torres & Berryhill

[57] ABSTRACT

Eyes in adjacent track segments in a bulldozer type track are secured to each other by a pin which is provided with a grease fitting and connecting passages for communicating lubricant to the bearing surfaces in the linkage. The pins are housed in a metal sleeve which cooperates with resilient seals to retain the lubricant in the linkage and to keep external matter away from the linkage bearing surfaces. The pin is held in place by removable retaining means so that the linkage may be separated and reattached without special equipment.

6 Claims, 4 Drawing Figures

U.S. Patent  May 25, 1976  3,958,836
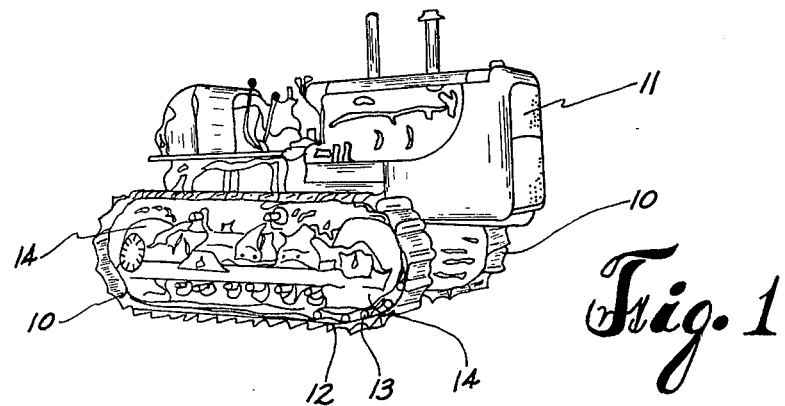
Fig. 1
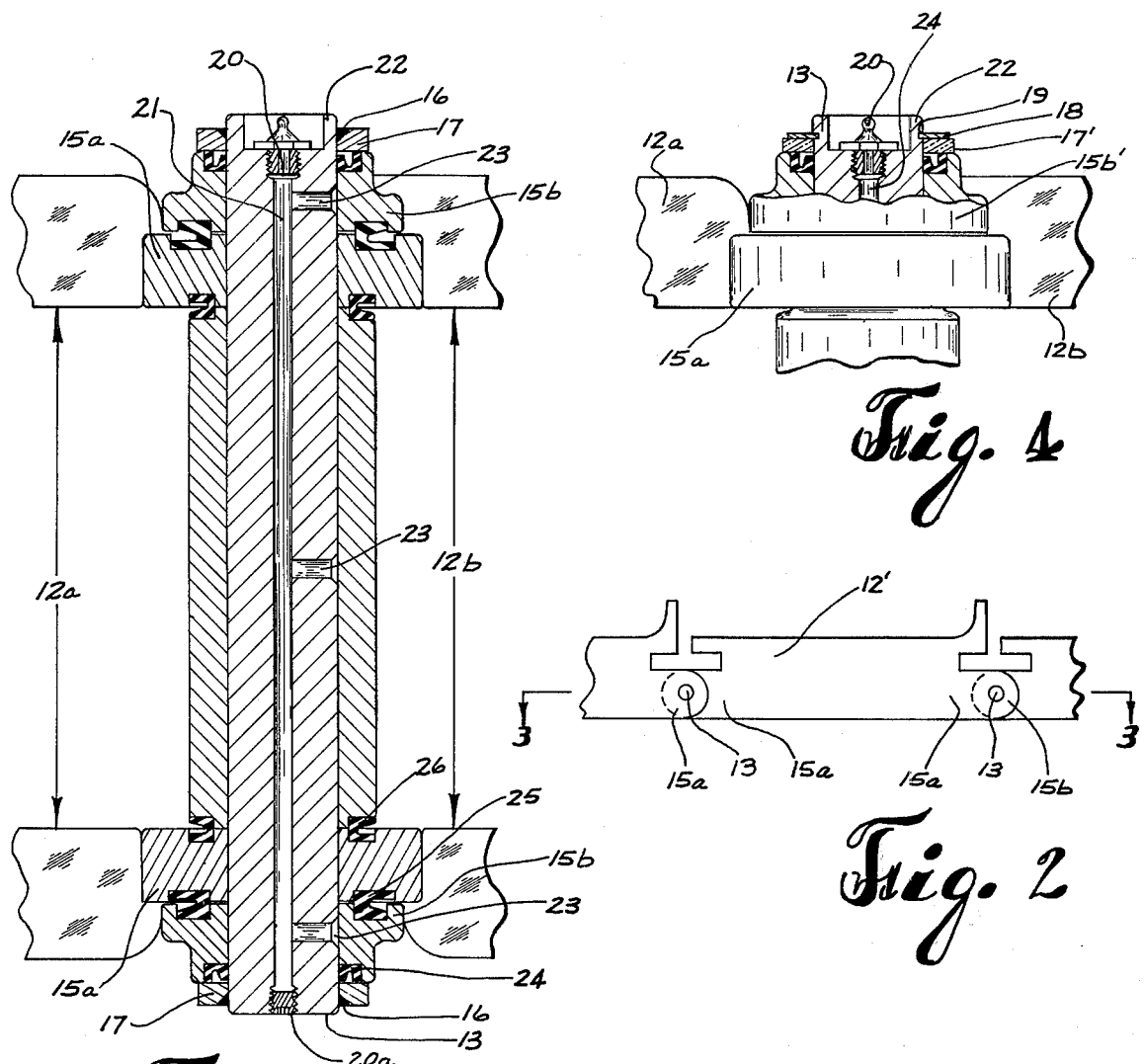
Fig. 4
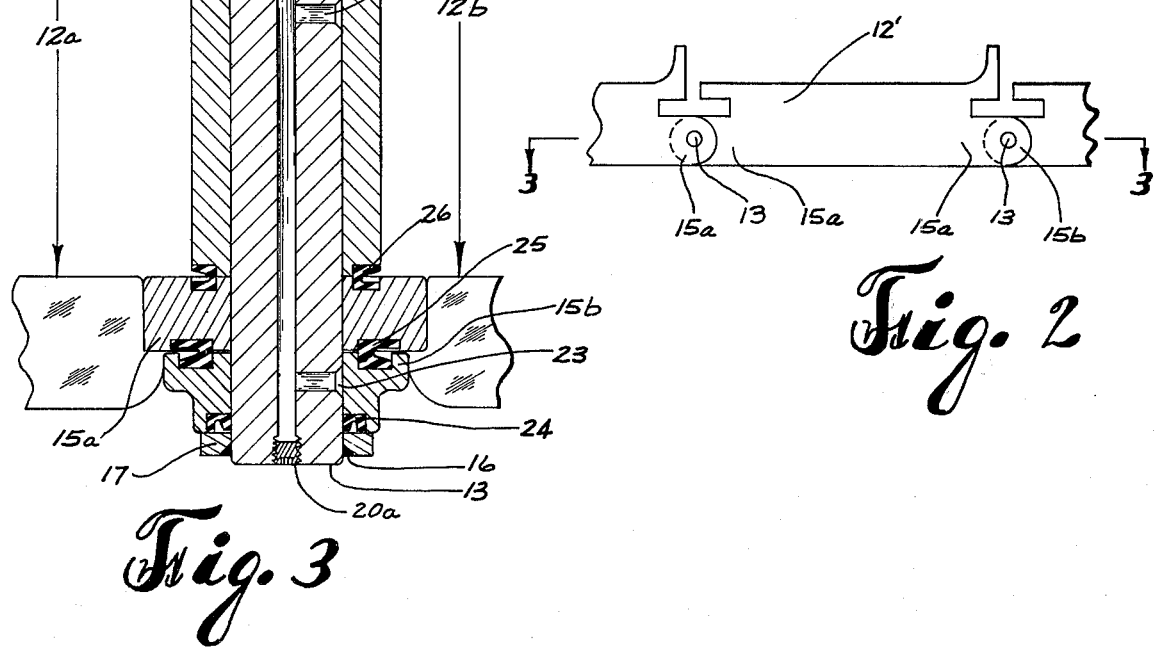
Fig. 2
Fig. 3

MOVABLE TRACK ASSEMBLY FOR DRIVE TRACKS

BACKGROUND OF THE INVENTION

The present invention relates to tracks used on track-driven vehicles such as bulldozers and military tanks. More particulary, this invention relates to a new and improved linkage for connecting adjacent segments in such tracks to each other.

In one common prior art track assembly, all of the linkages in adjacent track segments, except one master link, are press fitted together to form a metal-to-metal, pivotal joint. Special tools, not easily taken into the field, are required to repair or replace the track when these joints break or wear out. The joints between the segments in this well known type track wear out rapidly because they are unprotected and are constantly exposed to dirt and other abrasive materials. Moreover, the segments do not freely pivot relative to each other so that a significant portion of the energy required to operate the vehicle using the tracks is employed simply to overcome frictional forces in the track.

SUMMARY OF THE INVENTION

The track joint assembly of the present invention provides a lubricated, sealed connection between adjacent track segments in a bulldozer type track. The individual assemblies connecting each segment in a track include a pin which can be removed and reinstalled with readily available tools. As a result, repairs and track replacement may be made in the field.

Passages formed through the pin connect with an external grease fitting so that grease may be supplied to the internal wear surfaces in each joint assembly. The wear surfaces are also enclosed within resilient seals which hold the grease in place and keep out dirt and other abrasive matter.

From the foregoing, it will be appreciated that the improved joint assembly of the present invention provides a reduction in the frictional forces resisting movement of the track which in turn reduces the energy required to move the track. The reduction in friction also cooperates with the protective sealing of the joint assembly to extend the life of the assembly. Provision of a field removable and replaceable assembly makes it possible to quickly repair or replace a track without having to ship the entire vehicle or track to a remote facility.

Other advantages of this invention will become more readily apparent from the accompanying drawings, specifications and claims.

DESCRIPTION OF THE DRAWINGS

FIG. 1 is a perspective view of a track-driven bulldozer type vehicle mounted on segmented tracks;

FIG. 2 is an elevation showing a short segment of the track assembly of the invention;

FIG. 3 is an enlarged scale cross-sectional view taken along the line 3—3 of FIG. 2 illustrating details in a linkage constructed in accordance with the teachings of the present invention; and FIG. 4 is a partial cross-sectional view, on an enlarged scale, of an alternative embodiment of the track assembly of the present invention.

DESCRIPTION OF THE ILLUSTRATED EMBODIMENTS

FIG. 1 illustrates a bulldozer type vehicle or tractor 11 which employs segmented, endless tracks 10 constructed in accordance with the teachings of the present invention.

As best illustrated in FIG. 2, tracks 10 are formed from metal segments 12 pivotably joined together by metal pins 13. The tracks 10 are fitted on the drive sprockets 14 (FIG. 1) of the tractor 11 in a conventional "closed loop" fashion to provide a bearing path or track and to propel the tractor as the sprockets 14 are turned.

Referring to FIG. 3, it can be seen that adjacent track segments 12a and 12b of the track 10 are equipped with eye portions, 15a and 15b respectively, through which the pin 13 extends to hold the track segments together. When thus connected, segments 12a and 12b are pivotably secured relative to each other.

The pin 13 is retained in position within the eye segments 15a and 15b, by metal retaining rings 17 which are welded to the pin 13. A cutting torch is used to remove the rings when repair or replacement of the track is necessary.

In another embodiment of the invention, illustrated in FIG. 4, the pin 13 is retained in place by a metalic snap close, split ring 18 which is fitted into an annular groove 19 on the pin 13 adjacent the ring 17.

With specific reference to FIG. 3, it may be seen that the pin 13 is provided with a conventional lube fitting 20 which is located on at least one end of the pin for providing a suitable lubricant to the wear surfaces in the assembly. The fitting 20 is located within a recess 22 on the end of the pin 13 to protect the fitting from damage. The fitting 20 communicates with an axial lubrication channel 21 which extends centrally through the length of the pin 13. The lubrication channel 21 connects with radial ports 23 which convey lubricant to the desired locations in the joint. The opposite end of the channel 21 is sealed or plugged with a suitable plugging means 20a.

Resilient o-ring type seals 24–26 cooperate with a metal sleeve 27 to enclose the body of the pin 13. The seals function to trap the lubricant introduced from the fitting 20 to retain the lubricant in place. The application of lubricant also provides positive internal pressure on the seals which assists in keeping external matter out of the sealed area. The seals 24–26 may be constructed of neoprene rubber or any other suitable material.

The foregoing disclosure and description of the invention is illustrative and explanatory thereof, and various changes in the size, shape and materials as well as in the details of the illustrated construction may be made within the scope of the appended claims without departing from the spirit of the invention.

I claim:

1. An assembly for connecting adjacent segments of a track comprising:
   a. eye means extending from said adjacent segments;
   b. pin means extending through said eye means for pivotably securing said adjacent segments relative to said pin means and to each other;
   c. lubrication passage means extending through said pin means for communicating lubricant to the wear surfaces between said pin means and said eye means in each of the joined segments in said assembly;

d. sealing means enclosing at least a portion of the body of said pin means for retaining said lubricant in position on the portion of said wear surfaces included within said sealing means; and
e. releasable securing means for releasably securing said pin means within said eye means whereby said securing means may be removed to separate said segments.

2. An assembly as defined in claim 1 wherein said lubrication passage means comprises an axially extending bore connecting with a plurality of radially extending bores.

3. An assembly as defined in claim 1 wherein said sealing means comprises a tubular metal sleeve surrounding said pin means along a portion of said pin means length and a plurality of annular, o-ring seals for forming a sliding seal between said segments and said pin means.

4. An assembly as defined in claim 1 wherein said securing means includes metal rings connected to said pin means and having a diameter greater than the diameter of said eye means for holding said pin means in position within said eye means.

5. An assembly as defined in claim 4 wherein said securing means comprises a snap ring fitted into an annular groove in said pin means.

6. An assembly as defined in claim 4 wherein said securing means comprises a ring means welded in place on said pin means.

* * * * *